United States Patent [19]
Castellanos

[11] 3,832,073
[45] Aug. 27, 1974

[54] SWIVEL JOINT CONNECTION

[75] Inventor: Leopold J. Castellanos, Houston, Tex.

[73] Assignee: Esso Production Research Company, Houston, Tex.

[22] Filed: July 28, 1971

[21] Appl. No.: 166,961

Related U.S. Application Data

[62] Division of Ser. No. 23,663, March 30, 1970, Pat. No. 3,636,716.

[52] U.S. Cl. .................................. 403/121, 403/58
[51] Int. Cl. .......................................... F16c 11/00
[58] Field of Search....... 308/2 A, 2 R, 17 R; 64/16; 248/324; 287/DIG. 10, 92, 93; 403/121, 58, 57; 178/107

[56] References Cited
UNITED STATES PATENTS

| | | | |
|---|---|---|---|
| 595,538 | 12/1897 | Gardner | 64/16 |
| 2,030,074 | 2/1936 | Poole | 64/16 |
| 2,113,441 | 4/1938 | Curtis et al. | 64/16 |
| 3,323,842 | 6/1967 | Hanson | 308/2 R |

Primary Examiner—Andrew V. Kundrat
Attorney, Agent, or Firm—John S. Schneider

[57] ABSTRACT

A swivel joint for use in a buoyant articulated offshore platform. Two U-shaped interlocking links, each having a contact surface formed on the intermediate section connecting the two parallel extending sides, are oriented at 90° to each other. A plate is positioned between the two contact surfaces and the surfaces of the U-shaped links bear against a contact surface on each side of the plate when tensile forces are applied in opposite directions to the links. At least one of each of the contact surfaces bearing against each other is curved. The disposition of the curved bearing surfaces permits one of the links to rock against the intermediate plate in one plane whereas the other link can rock in a plane at 90° to the one plane. This arrangement permits the outer end of the link to swing in any direction with respect to the outer end of the mating link.

5 Claims, 12 Drawing Figures

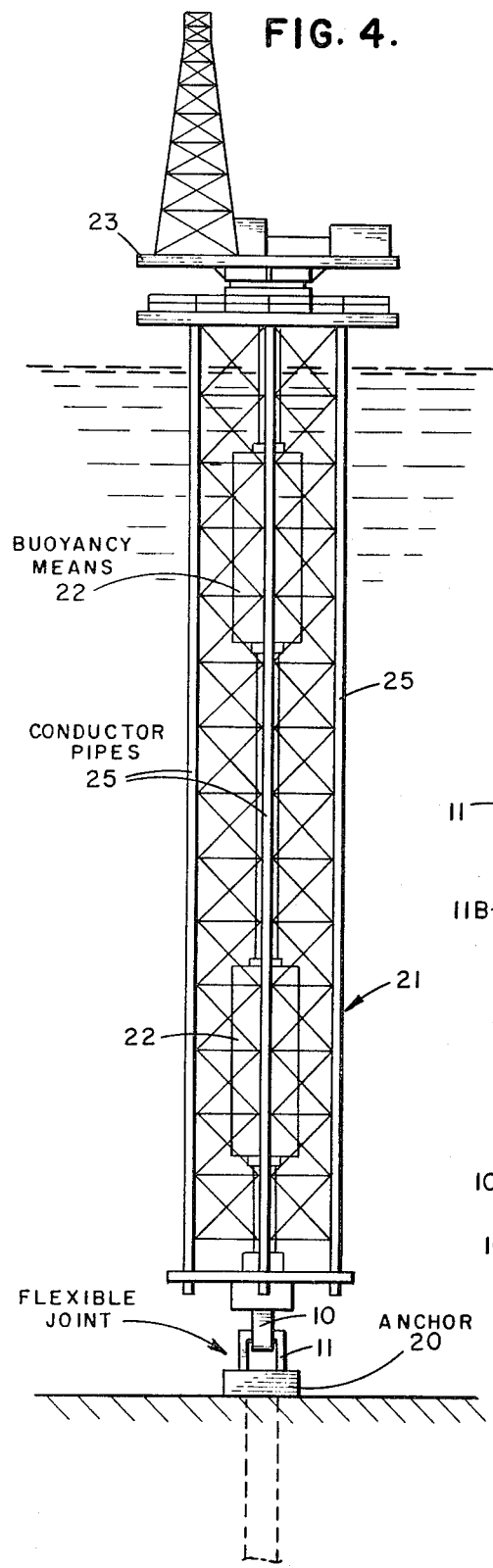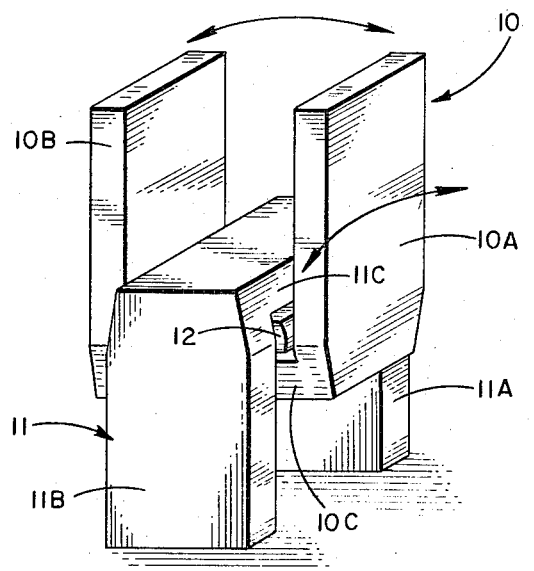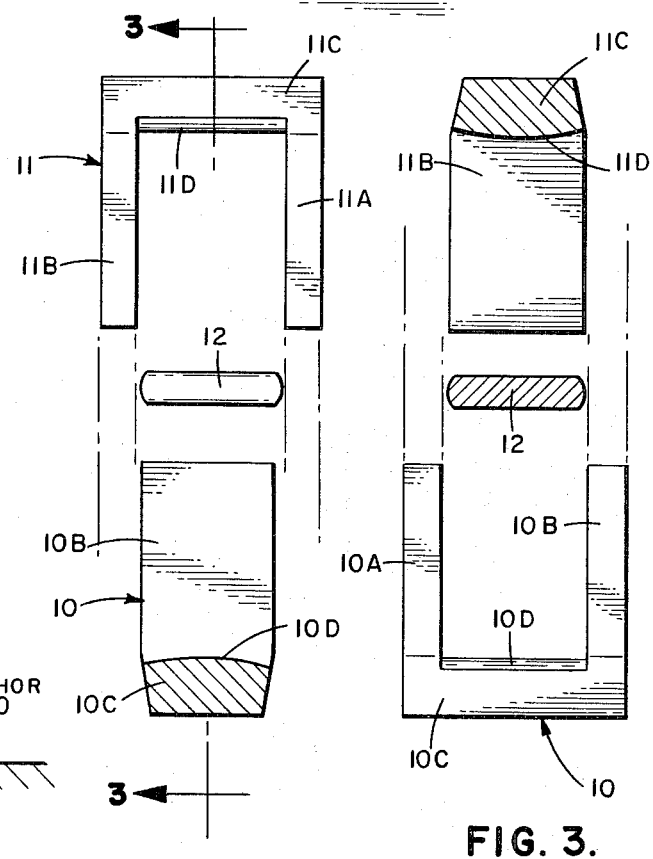

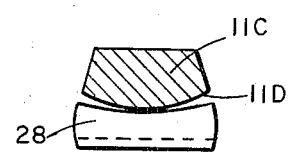
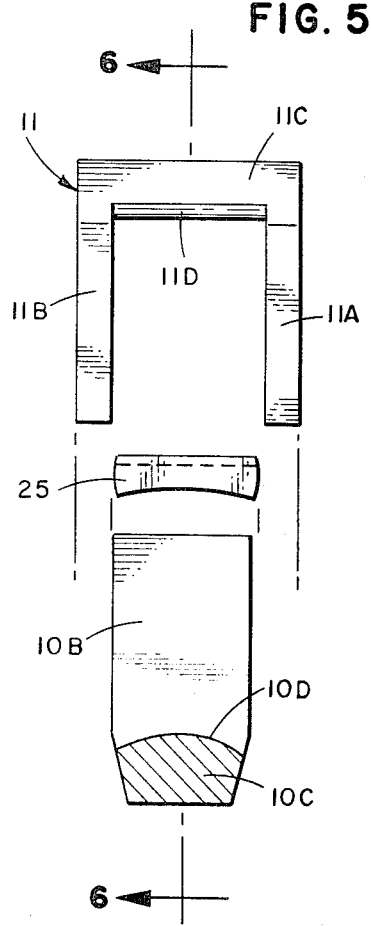
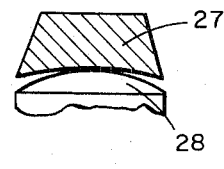
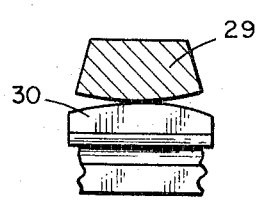
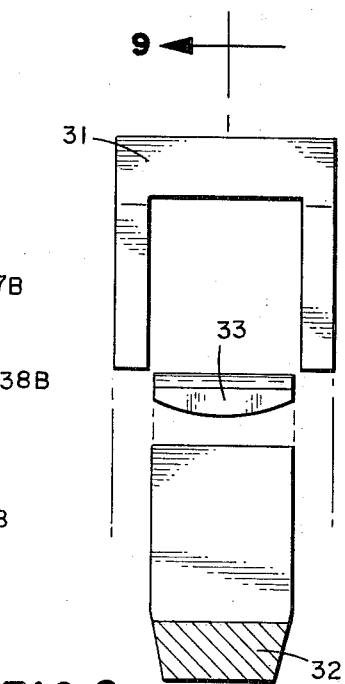
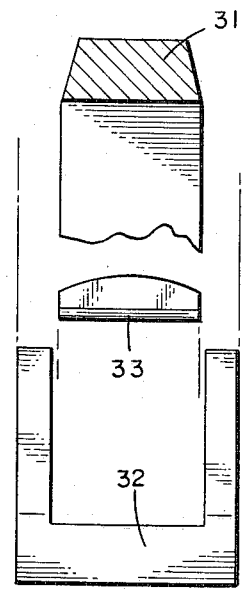
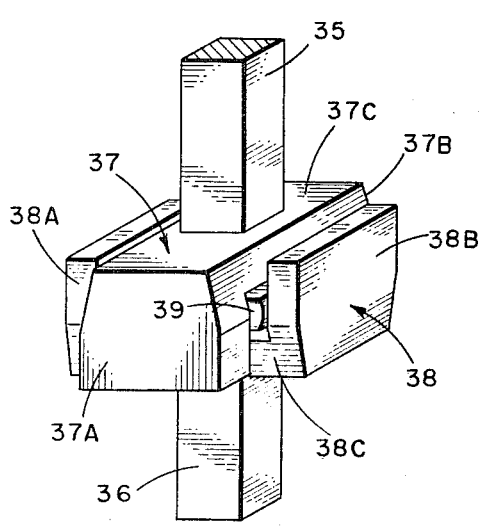
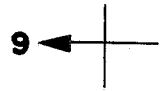

SWIVEL JOINT CONNECTION

This is a division of application Ser. No. 23,663 filed Mar. 30, 1970 and now Pat. No. 3,636,716.

The present invention concerns a swivel joint connection which is usable with articulated offshore oil and gas drilling and production platforms. These platforms comprise a base which lies on the ocean floor and represents a fixed point; a joint which connects the base to the foot of a buoyant tower; buoyancy means for applying an upward force to the tower; and a platform deck for conducting operations. The platform oscillates in motion with the waves and the maximum inclination angle is limited by the size of the buoyancy means. The joint of the present invention is particularly advantageous in the subsea environment in which it is to be used since it does not require lubrication. Also it will perform well in sea water since it can be built of materials which would protect it against corrosion, erosion and attack by marine organisms.

In accordance with the teachings of the invention, the swivel joint comprises a first U-shaped link having two spaced apart parallel sides connected to a plate member provided with a contact surface; a second U-shaped link having two spaced apart parallel sides connected to a plate member provided with contact surfaces; and an intermediate plate member arranged between said contact surfaces. At least one of each of the contact surfaces bearing against each other is curved, said contact surfaces being oriented 90° to each other.

BRIEF DESCRIPTION OF THE DRAWINGS

FIG. 1 is an isometric view of the swivel joint of the invention;

FIG. 2 is an exploded view partly in section of the components of such joint;

FIG. 3 is an exploded view partly in section taken along the lines 3—3 of FIG. 2;

FIG. 4 illustrates the swivel joint shown in FIGS. 1, 2 and 3 connecting a base member to a buoyant tower;

FIG. 5 is an exploded view partly in section of a modification of the swivel joint;

FIG. 6 is a view taken on lines 6—6 of FIG. 5;

FIG. 7 is a fragmentary view of a portion of FIGS. 5 and 6;

FIG. 7A is a view showing a modified curved surface of FIG. 7;

FIG. 8 is an exploded view partly in section of still another modification of the swivel joint;

FIG. 9 is a view taken down along lines 9—9 of FIG. 8;

FIG. 10 is a fragmentary view of still another modification of the curved surfaces; and FIG. 11 is an isometric view of a modified swivel joint.

DESCRIPTION OF THE PREFERRED EMBODIMENTS

Referring to FIGS. 1, 2 and 3 there are shown two U-shaped links 10 and 11 and a flat plate member 12. Link 10 comprises two spaced apart parallel extending plate sections or sides 10A and 10B and an intermediate plate section 10C. Similarly link 11 comprises two spaced apart parallel extending plate sections or sides 11A and 11B and an intermediate plate section 11C. The inner surfaces 10D and 11D of plate sections 10C and 11C, respectively, are machined to large radius convex curvatures. As shown particularly in FIG. 1 the curved surfaces 10D and 11D are oriented at 90° to each other when U-shaped links 10 and 11 are interlocked. Flat plate 12 is sufficiently thick to be very rigid. Curved surfaces 10D and 11D bear against flat plate 12 when tensile forces are applied in opposite directions to the links. As indicated by the arrows, the disposition of the curved bearing surfaces 10D and 11D permits link 10 to rock against the intermediate flat plate 12 in one plane whereas link 11 can rock in a plane at 90° to the one plane. This combination permits the outer end of one of the links to swing in any direction with respect to the outer end of the other mating link. The sides of the "U" maintain the relative positions of the parts of the connection and serve as means for attachment of the parts to each other.

Referring to FIG. 4 the swivel joint is connected into a buoyant tower offshore structure. Link 11 is secured to a base member 20 and link 10 is secured to the base of a buoyant tower 21 which has connected to it within the interior thereof buoyancy tanks 22. An operations platform 23 is mounted at the uppermost end of buoyant tower 21 above the surface of the water. A plurality of conductor pipes 25 for the production of gas and oil are arranged about the periphery of buoyant tower 21. These conductor pipes connect into subsea production systems, not shown.

Very large loads are supportable by the swivel joint rocker combination described supra. Although in their intended use with the buoyant tower the links will move through small angles, the swivel can be used where reasonably large angles are required.

The bearing surfaces 10D and 11D and contact plate 12 are preferably coated with an abrasion resistant material such as tungsten carbide which has a high corrosion resistance.

FIGS. 5 and 6 illustrate a modification in which an intermediate plate 25 is provided with concave contact surfaces on each side thereof.

In FIG. 7 the concave contact surface of plate member 25 is shown larger in radius than the convex curvature of the contacting surface of the plate section 26 to permit the required angular rotation without slippage.

FIG. 7A illustrates a concave surface on a plate section 27 and a convex surface on an intermediate plate member 28. The radius of the curvature of the surface of plate section 27 is greater than that of the curved surface of plate member 28.

FIG. 10 illustrates the use of convex contacting surfaces of both a plate section 29 and an intermediate plate member 30.

FIGS. 8 and 9 illustrate flat intermediate plate sections 31 and 32 surfaces and a plate member 33 having convex surfaces on each side thereof.

In FIG. 11 a compression type joint is shown in which two shaft members 35 and 36 are connected together by the swivel joint U-shaped links 37 and 38. These links have shortened sides 37A, 37B and 38A, 38B connected to plate sections 37C, 38C which contact the surfaces of intermediate plate member 39.

Having fully described the apparatus, operation, objects, and advantages of my invention, I claim:

1. A swivel joint connection comprising:

a first U-shaped link having two spaced apart parallel sides and a transverse end plate section connected thereto provided with a contact surface;

a second U-shaped link having two spaced apart parallel sides and a transverse end plate section connected thereto provided with a contact surface;

said first and second links being interlocked and oriented at 90° to each other with said transverse end plate sections adjacent each other forming a substantially rectilinear box-like enclosure bounded by the sides and transverse end plate section of each link; and a contact plate member arranged between said links and substantially filling said enclosure and in contact with said contact surfaces, at least one of each of said surfaces in contact being curved, the relative curvature of the contact surfaces on one side of the contact plate member permitting a rocking motion of said first link in one plane and the relative curvature of the contact surfaces on the other side of the contact plate member permitting a rocking motion of said second link in a plane at 90° to said one plane.

2. A swivel joint as recited in claim 1 in which the contact surfaces of said contact plate member are flat.

3. A swivel joint as recited in claim 1 in which at least one contact surface of said contact plate member is curved.

4. A swivel joint as recited in claim 1 in which the contact surface of the transverse end plate section of at least one of said U-shaped links is flat.

5. A swivel joint as recited in claim 1 in which the contact surface of the transverse end plate section of at least one of said U-shaped links is curved.

* * * * *